(12) United States Patent
Furukawa

(10) Patent No.: US 11,993,249 B2
(45) Date of Patent: May 28, 2024

(54) VEHICLE TESTING SYSTEM AND VEHICLE TESTING METHOD

(71) Applicant: HORIBA, LTD., Kyoto (JP)

(72) Inventor: Kazuki Furukawa, Kyoto (JP)

(73) Assignee: Horiba, Ltd. (JP)

( * ) Notice: Subject to any disclaimer, the term of this patent is extended or adjusted under 35 U.S.C. 154(b) by 491 days.

(21) Appl. No.: 17/297,180

(22) PCT Filed: Nov. 28, 2019

(86) PCT No.: PCT/JP2019/046635
§ 371 (c)(1),
(2) Date: May 26, 2021

(87) PCT Pub. No.: WO2020/111192
PCT Pub. Date: Jun. 4, 2020

(65) Prior Publication Data
US 2022/0017067 A1    Jan. 20, 2022

(30) Foreign Application Priority Data

Nov. 28, 2018    (JP) .................................. 2018-221959

(51) Int. Cl.
*B60W 20/20*    (2016.01)
*B60W 50/14*    (2020.01)
(Continued)

(52) U.S. Cl.
CPC ............ *B60W 20/20* (2013.01); *B60W 50/14* (2013.01); *B60W 60/001* (2020.02); *G06V 20/58* (2022.01);
(Continued)

(58) Field of Classification Search
CPC .... B60W 20/20; B60W 60/001; B60W 50/14; B60W 2554/4041; B60W 2050/146; B60W 2420/42; G06V 20/58
See application file for complete search history.

(56) References Cited

U.S. PATENT DOCUMENTS

| 6,124,925 A | 9/2000 | Kaneko et al. |
| 7,103,460 B1 * | 9/2006 | Breed .................... G07C 5/008 |
| | | 706/15 |

(Continued)

FOREIGN PATENT DOCUMENTS

| CN | 101198996 A | 6/2008 |
| CN | 102460066 A | 5/2012 |

(Continued)

OTHER PUBLICATIONS

International Search Report dated Jan. 28, 2020 issued for International Application No. PCT/JP2019/046635, 5 pgs.

(Continued)

*Primary Examiner* — Peter D Nolan
*Assistant Examiner* — Wae L Louie
(74) *Attorney, Agent, or Firm* — Brooks Kushman P.C.

(57) ABSTRACT

The present invention makes it possible to reduce the burden on a user in vehicle testing while maintaining precision of vehicle testing, and is a vehicle testing system for testing, on a test bench, a vehicle or a test piece that is a portion of a vehicle, the vehicle testing system being provided with a camera for capturing an image of a portion of a test piece, and a control device for controlling vehicle testing on the basis of the image captured by the camera.

10 Claims, 4 Drawing Sheets

(51) Int. Cl.
  *B60W 60/00* (2020.01)
  *G06V 20/58* (2022.01)
(52) U.S. Cl.
  CPC . *B60W 2050/146* (2013.01); *B60W 2420/403* (2013.01); *B60W 2554/4041* (2020.02)

(56) References Cited

U.S. PATENT DOCUMENTS

| | | | | |
|---|---|---|---|---|
| 10,006,834 | B2* | 6/2018 | Tanaka | G01M 17/0072 |
| 2005/0273218 | A1* | 12/2005 | Breed | G06K 7/10178 |
| | | | | 701/2 |
| 2008/0161995 | A1 | 7/2008 | Nakajima et al. | |
| 2009/0088978 | A1 | 4/2009 | Ishikawa et al. | |
| 2014/0052333 | A1 | 2/2014 | Elder | |
| 2014/0288859 | A1 | 9/2014 | Wittmann | |
| 2014/0346894 | A1* | 11/2014 | Csicsay | H01M 10/48 |
| | | | | 307/116 |
| 2015/0158513 | A1 | 6/2015 | Costa et al. | |
| 2015/0338313 | A1* | 11/2015 | Tanaka | G01M 17/007 |
| | | | | 701/32.8 |
| 2016/0167641 | A1 | 6/2016 | Yoon | |
| 2019/0031102 | A1 | 1/2019 | Kishimoto | |
| 2020/0364956 | A1* | 11/2020 | Hachiken | B25J 13/08 |
| 2021/0178984 | A1* | 6/2021 | Goth | B60R 11/04 |
| 2022/0017067 | A1* | 1/2022 | Furukawa | B60W 20/20 |
| 2023/0286531 | A1* | 9/2023 | Laverne | B60W 50/10 |
| 2023/0311651 | A1* | 10/2023 | Tatebe | B60K 26/021 |
| | | | | 74/512 |

FOREIGN PATENT DOCUMENTS

| | | |
|---|---|---|
| CN | 102628854 A | 8/2012 |
| CN | 103196679 A | 7/2013 |
| CN | 104627094 A | 5/2015 |
| CN | 105092257 A | 11/2015 |
| CN | 205997850 U | 3/2017 |
| CN | 107195024 A | 9/2017 |
| CN | 107221124 A | 9/2017 |
| CN | 107764306 A | 3/2018 |
| CN | 207570802 U | 7/2018 |
| CN | 108602465 A | 9/2018 |
| CN | 108603807 A | 9/2018 |
| CN | 208012875 U | 10/2018 |
| CN | 108725353 A | 11/2018 |
| DE | 102008009378 B3 | 7/2009 |
| EP | 2947447 A1 | 11/2015 |
| JP | 08-082579 A | 3/1996 |
| JP | 10-232187 A | 9/1998 |
| JP | 2000-280780 A | 10/2000 |
| JP | 2002-257688 A | 9/2002 |
| JP | 2005-049353 A | 2/2005 |
| JP | 2005-351730 A | 12/2005 |
| JP | 2007-038782 A | 2/2007 |
| JP | 2008-209122 A | 9/2008 |
| JP | 2009-085628 A | 4/2009 |
| JP | 2009-146289 A | 7/2009 |
| JP | 2009-222679 A | 10/2009 |
| JP | 2010-023836 A | 2/2010 |
| JP | 2016-053531 A | 4/2016 |
| JP | 2017-070158 A | 4/2017 |
| JP | 2017-126151 A | 7/2017 |
| KR | 2002-0095656 A | 12/2002 |
| KR | 10-1372832 B1 | 3/2014 |
| WO | WO2008/132999 A | 6/2008 |
| WO | WO2011/002441 A1 | 1/2011 |
| WO | 2017-130507 A1 | 8/2017 |
| WO | WO2017/160201 A1 | 9/2017 |

OTHER PUBLICATIONS

Office Action dated Feb. 24, 2023 issued in CN patent application No. 201980076549.X.

Extended European Search Report for Application No. 19890053. 2—1001/3889570 PCT/JP2019046635, dated Jul. 6, 2022, 9 Pages.

* cited by examiner

VEHICLE TESTING SYSTEM AND VEHICLE TESTING METHOD

CROSS-REFERENCE TO RELATED APPLICATIONS

This application is the U.S. national phase of PCT Application No. PCT/JP2019/046635, filed Nov. 28, 2019, which claims priority to Japanese Patent Application No. 2018-221959, filed Nov. 28, 2018, which are both incorporated by reference herein in their entireties.

TECHNICAL FIELD

The present invention relates to a vehicle testing system and the like that are used in order to perform a simulated running test on a vehicle or the like which is serving as a test body.

TECHNICAL BACKGROUND

Depending on the type of vehicle test, there are instances in which a test, such as an exhaust gas analysis or the like, is performed under conditions in which various states such as, for example, a remaining battery charge or a cooling water temperature or the like of each test body are uniformly matched. In cases such as these, it is necessary for example, to begin testing or to alter the test conditions at a point when each test body has reached a particular specific state.

As is described above, in order to uniformly match the states of the test bodies and perform a vehicle test in a desired state, it is necessary to obtain information about the states of the test bodies. One method that might be considered in order to achieve this is to acquire data from an ECU (Electronic Control Unit) that is installed in the test body.

However, it is necessary to perform complicated operations in order to access this type of ECU. Moreover, in recent years, in order to combat hacking and the like, vehicle ECU have been set up so that only the automobile manufacturer is able to access their vehicle ECU.

For this reason, conventionally, vehicle tests have been performed by a human user verifying the states of a test body by directly confirming a display such as a meter panel or the like with their own eyes.

DOCUMENTS OF THE PRIOR ART

Patent Documents

[Patent Document 1] Japanese Unexamined Patent Application (JP-A) No. 2005-049353

DISCLOSURE OF THE INVENTION

Problems to be Solved by the Invention

The present invention was conceived in view of the above-described circumstances, and it is a principal object thereof to provide a vehicle testing system that, while maintaining the accuracy of a vehicle test, enables the burden on a user during the vehicle test to be lightened.

Means for Solving the Problem

In other words, a vehicle testing system according to the present invention is equipped with a camera that acquires images of a portion of a test body, and a control device that controls a vehicle test based on images acquired by the camera.

According to this type of vehicle testing system, because a vehicle test is controlled based on images of the test body acquired by the camera, a user is able to reduce the time and effort required to perform a vehicle test while verifying the states of the test body.

If a structure is employed in which the control device is equipped with a recognition portion that recognizes a state of the test body based on the images, and a test control portion that starts a predetermined test when a state of the test body as recognized by the recognition portion attains a predetermined state, then a user is able to reduce the time and effort required to perform operations such as starting testing in the vehicle testing system in accordance with the state of the test body.

An example of a specific embodiment of the present invention is an embodiment in which the control device is further equipped with a data storage portion in which image data associated with the states of the test body is stored in advance, and the camera acquires images of the state display portion at timings when the state display portion is fully illuminated, and the recognition portion recognizes positions of the image data in the state display portion by searching for the image data stored in the data storage portion from the images of the state display portion in the fully illuminated state acquired by the camera.

If a structure is employed in which the camera acquires images of a state display portion that displays states of the test body to a driver of that test body, then because various instruments such as a tachometer, a speedometer, fuel and battery gauges, a cooling water temperature gauge and the like are grouped together in the state display portion, compared with a case in which images of other portions are acquired, it is possible to recognize states of a test body in greater detail using the recognition portion.

An example of a specific embodiment of the present invention is an embodiment in which the recognition portion recognizes a remaining battery charge of the test body as the state of the test body, and, in a case in which the remaining battery charge has reached a predetermined value, the test control portion starts predetermined tests. In a case in which the test body is a hybrid vehicle or the like, in the vehicle test, the remaining battery charge of the test body may be used as an important parameter. For this reason, depending on the type of vehicle testing, once the states of each vehicle have been uniformly matched, there is a need for vehicle testing to be performed.

Note that in a case in which the test body is a hybrid vehicle or the like, and in a mode in which this hybrid vehicle is running on battery power, there are instances in which the main power supply of the test body is turned ON even through the engine is stopped.

In particular, in a case in which testing is conducted using an automatic driving device such as a driving robot or the like, then because the vehicle testing system is unable to determine whether or not the main power supply of the test body is turned ON without a user supplying this information, there are instances in which abnormalities appear in the vehicle testing results.

For this reason, if a structure is employed in which the vehicle testing system is further equipped with an automatic driving device, and the recognition portion recognizes an ON/OFF state of a main power supply of the test body as the state of the test body, and, in a case in which the main power supply of the test body is turned ON, the test control portion starts vehicle testing of the test body, then it is possible to prevent problems of this type from occurring.

It is also possible for the recognition portion to recognize an abnormality in the test body as a state of the test body, and, in a case in which the control portion receives a signal from the output portion to the effect that an abnormality in the test body has been recognized, for the control portion to control the automatic driving device so as to suspend the running of the test body, and to also stop the vehicle testing for that test body. By employing a structure such as this, even in the case of automatic driving, in which it is more difficult to notice an abnormality compared to when a person is driving, it is possible to further improve the safety of the driving test.

Effects of the Invention

According to the present invention, a user is able to reduce the time and effort required to perform a vehicle test while verifying the states of a test body.

In addition, because it is possible to recognize states of a test body in greater detail when performing a vehicle test, the accuracy and safety of the vehicle test can be improved.

DESCRIPTION OF THE REFERENCE NUMERALS

100 . . . Vehicle Testing System
2 . . . Automatic Driving Device
4 . . . Control Device
5 . . . Camera
6 . . . Recognition Portion
8 . . . Data Storage Portion
V . . . Test Vehicle
D . . . State Display Portion Best Embodiments for Implementing the Invention Hereinafter, a vehicle testing system 100 according to an embodiment of the present invention will be described with reference to the respective drawings.

[Basic Structure of the Vehicle Testing System According to the Present Embodiment]

Figure 1:
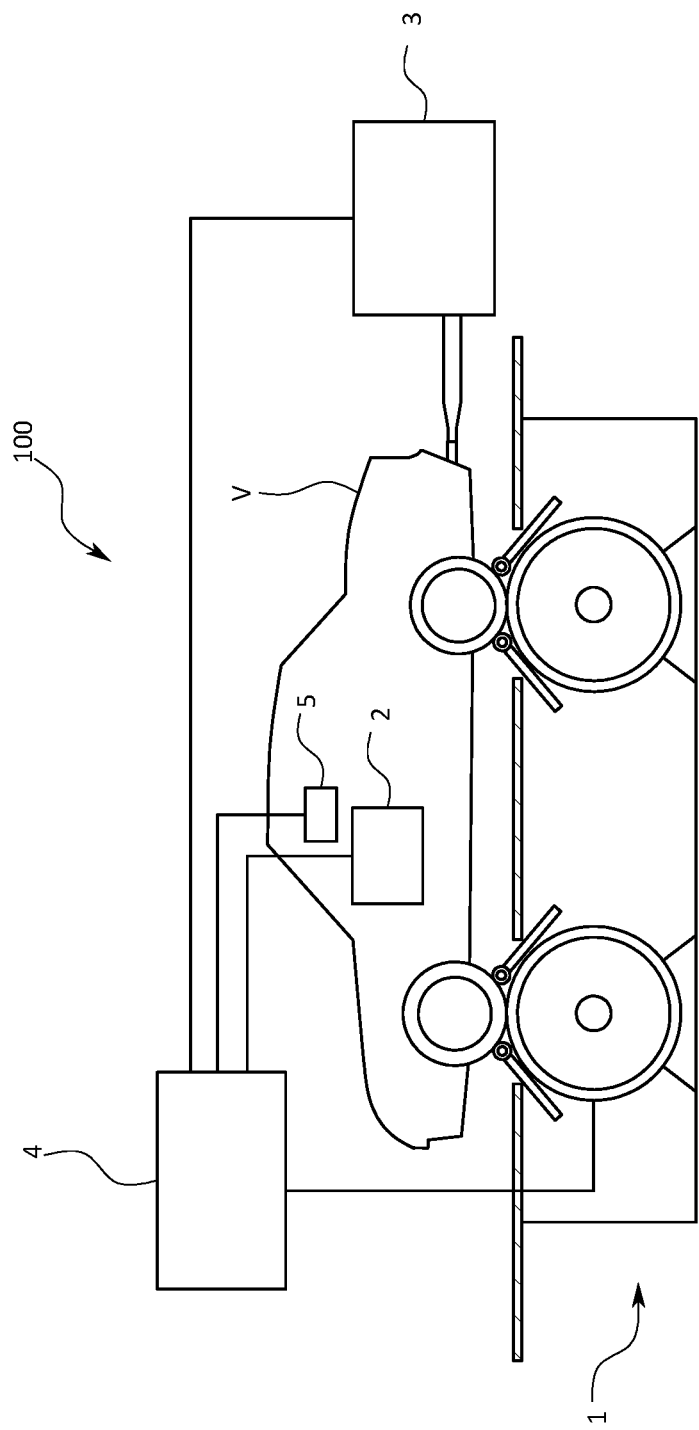
FIG. 1 is an overall typical view of a vehicle testing system according to an embodiment of the present invention.

As is shown in FIG. 1, the vehicle testing system 100 is equipped with a chassis dynamometer 1 that applies a load to a vehicle which is serving as a test body, an automatic driving device 2 such as a driving robot or the like that drives a vehicle that has been placed on the chassis dynamometer 1, an analysis device 3 that analyzes exhaust gas and the like emitted from the vehicle, and a control device 4 that controls the vehicle testing by controlling the chassis dynamometer 1, the automatic driving device 2, and the analysis device 3. Note that the chassis dynamometer 1 may also be called a test bench.

A driving robot drives a vehicle by using one or more robots to operate at least one of, or else a combination of an accelerator, a brake, and a steering wheel of a vehicle. It should be noted that the automatic driving device 2 is not limited to being a driving robot, and may be any device that drives a vehicle by supplying control signals to the vehicle.

Figure 2:
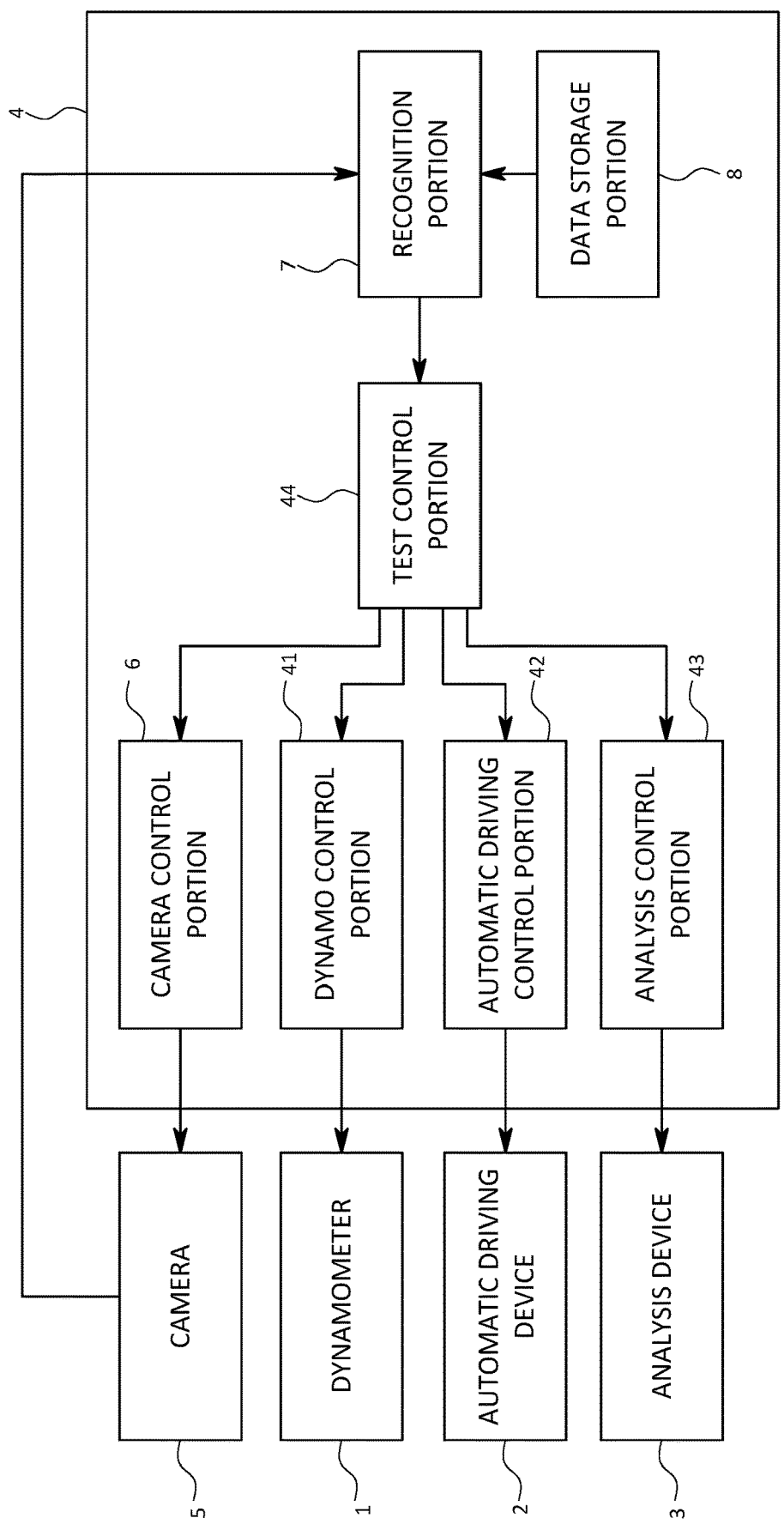
FIG. 2 is a typical view showing a control device of the present embodiment.

The control device 4 is formed by a computer main body that is, in turn, formed by a CPU, memory, an A/D converter, a D/A converter, and communication ports and the like, and by input devices such as a keyboard and a mouse and the like, as well as a display monitor that are connected to the computer main body. By installing predetermined programs in the memory, as is shown in FIG. 2, the control device 4 is able to perform functions of a dynamo control portion 41 that controls the chassis dynamo 1, an automatic driving control portion 42 that controls the automatic driving device 2, an analysis control portion 43 that controls the analysis device 3, and a test control portion 44 that governs these respective control portions, and the like.

[Basic Control Method of the Vehicle Testing System According to the Present Embodiment]

In the vehicle testing system 100, the method by which the control device 4 controls the vehicle testing may be, for example, as follows.

Firstly, a user selects a type of vehicle testing to be implemented and also conditions for this testing and the like in the vehicle testing system 100, and inputs a signal to start testing. In this way, depending on the type of vehicle testing and the conditions thereof and the like that have been selected, the vehicle states and the test conditions and the like are mutually associated with each other in advance, and are input into the test control portion 44.

When a vehicle testing start signal is input, the test control portion 44 controls the vehicle testing by outputting a signal to the dynamo control portion 41, the automatic driving control portion 42, and the analysis control portion 43 in accordance with the type of vehicle testing and conditions thereof selected by the user, and causing each of the chassis dynamometer 1, the automatic driving device 2, and the analysis device 3 to be operated via their respective control portions.

This control of the vehicle testing includes driving the vehicle, controlling the load applied by the chassis dynamometer 1, starting, ending, and suspending exhaust gas analysis and the like, and altering the test conditions and the like. In addition, this control includes various other operations such as repeating a test, switching the testing sequence, and altering the control mode and the like. The testing sequence is the sequence of a series of operations performed by the vehicle testing system 100 from the start of a predetermined vehicle test until the end thereof.

[Characteristic Structure of the Vehicle Testing System According to the Present Embodiment]

Moreover, the vehicle testing system 100 according to the present embodiment is further provided with a camera 5 that acquires images of a portion of a vehicle, a camera control portion 6 that controls the camera 5, and a recognition portion 7 that receives and recognizes images acquired by the camera 5, and outputs the results of such recognitions to the test control portion 44.

The camera 5 acquires images of a state display portion D that displays states of the test body to a driver, and is provided, for example, inside the vehicle serving as the test body. The camera 5 is fixed, via a supporting component or the like, in a position that is approximately the same as the viewpoint of a driver who is sitting in the driver's seat of the vehicle.

Figure 3:
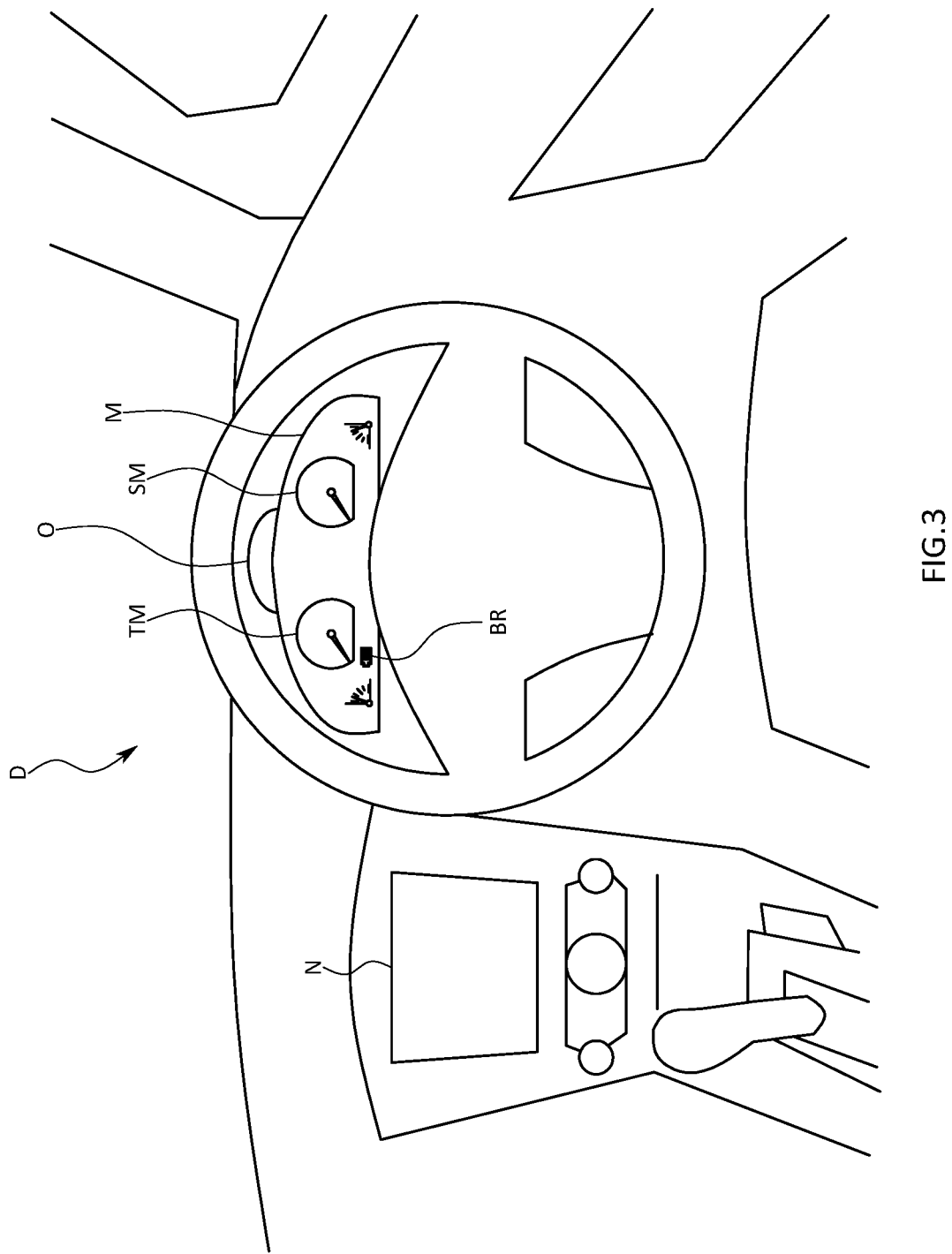
FIG. 3 is a typical view showing an example of a state display portion in the present embodiment.

As is show in FIG. 3, the state display portion D may include instruments that display vehicle information such as, for example, a meter panel M that is provided with a tachometer TM, a speedometer SM, and a remaining battery charge display light BR and the like, a display screen O that is located outside the meter panel M, and a display screen N of a car navigation system and the like.

The camera control portion 6 controls operations of the camera 5, and supplies signals that turn the power supply of the camera 5 ON and OFF, and start and end image capturing and the like to the camera 5, and also controls the image capture range of the camera 5 and the focal point of the camera 5 and the like.

The recognition portion 7 recognizes states of a vehicle based on images acquired by the camera 5. More specifically, the recognition portion 7 recognizes states of a vehicle based on images of the meter panel M portion of the vehicle and on known data with which it has been previously supplied.

This known data may include, from among the images of the meter panel M acquired by the camera 5, position information specifying which meters located in which positions, and which illumination states of which display lights and warning lights the recognition portion 7 should recognize, as well as state recognition information in which the meters, and the illumination states of the display lights and warning lights are associated with states of the vehicle, and is stored in the data storage portion 8 shown in FIG. 2.

Figure 4:
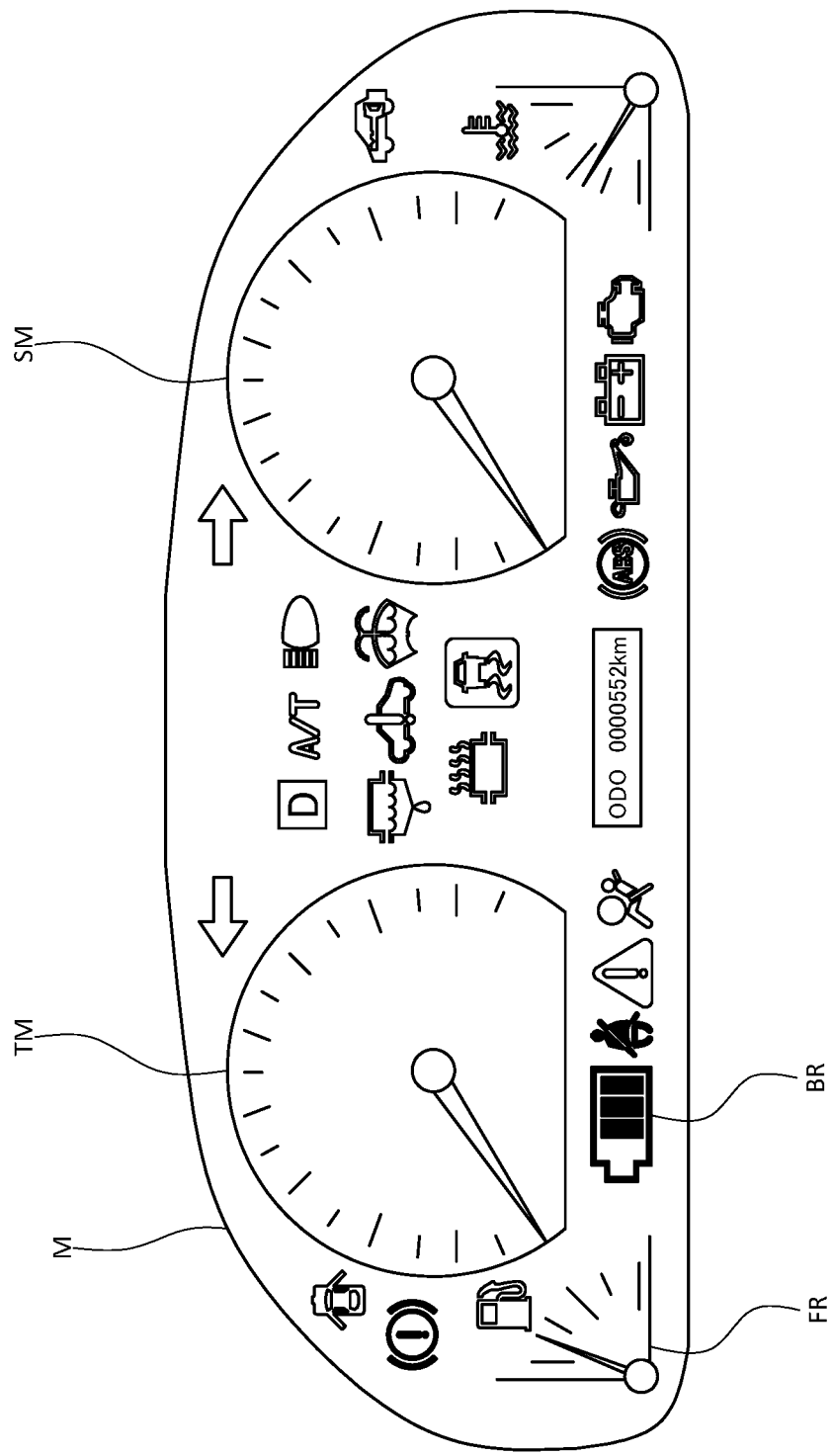
FIG. 4 is a typical view showing an example of the state display portion of the present embodiment.

For example, in a case in which the state of a vehicle that is being recognized relates to the remaining battery charge, then position information for the remaining battery charge display light BR on the meter panel M shown in FIG. 4, and state recognition information in which the illumination state of the remaining battery charge display light BR and the value of the remaining battery charge are mutually associated with each other, are stored in the date storage portion 8.

In this case, the state recognition information is obtained by mutually associating, for example, previously acquired images of the remaining battery charge display light BR with the remaining battery charge at the point in time when these images were acquired, and then storing this information.

In the same way, position information for the respective meters, and data obtained by associating the images of each meter with the states of the vehicle when those images were acquired are also stored for the speedometer SM, the tachometer TM, a remaining fuel gauge FR, and a water temperature gauge WT as well.

Moreover, position information specifying where on the meter panel M each of the display lights and warning lights are disposed, and data obtained by associating the illumination states of each of these display lights and warning lights with the states of the vehicle are also stored in the data storage portion 8 for, for example, a water temperature abnormality warning light, a remaining fuel warning light, a battery warning light, an AT fluid warning light, an oil pressure warning light, a fuel filter warning light, an ABS warning light, a hybrid system warning light, an engine abnormality warning light, a brake warning light, an airbag warning light, a seatbelt warning light, an electronic stability control operation display light, a door ajar warning light, a washer fluid warning light, a security immobilizer light, and a master warning light and the like as well.

By installing predetermined programs for the camera control portion 6, the recognition portion 7, and the data storage portion 8 in the memory, the above-described control device 4 is able to perform the functions of each of these portions.

[Characteristic Control Method of the Vehicle Testing System According to the Present Embodiment]

A method in which the control device 4 according to the present embodiment controls vehicle testing based on images acquired by the camera 5 will now be described.

Firstly, when a signal to start vehicle testing is input by a user, the test control portion 44 sends a signal to the camera control portion 6.

Based on the signal from the test control portion 44, the camera control portion 6 causes the camera 5 to start acquiring images of a portion of the meter panel M, such as that shown in FIG. 4, which is serving as the vehicle state display portion D.

The image acquisition performed by the camera 5 is performed immediately after the main power supply, at least, of the vehicle is turned ON. In this embodiment, for example, the image acquisition performed by the camera 5 is started at a timing that matches the timing when the automatic driving device 2 turns ON the main power supply of the vehicle. Image data acquired by the camera 5 is sent to the recognition portion 7 in real time.

Based on the images of the meter panel M that are acquired by the camera 5 and are sent continuously in real time, and on the known data stored in the data storage portion 8, the recognition portion 7 recognizes states of the vehicle at the points in time when those images were acquired, and outputs the recognition results to the test control portion 44. Once the test control portion 44 has received the output signal from the recognition portion 7, it controls the vehicle test based on test conditions previously set by a user and on the signals output from the recognition portion 7.

More specifically, for example, when the recognition portion 7 compares the image data sent from the camera 5 with known image data showing a state of the vehicle which is a precondition for starting a predetermined test, and recognizes that these respective sets of image data match each other, the test control portion 44 which has received the signal from the recognition portion 7 controls the vehicle test in the manner described above, and causes the predetermined test set by the user to start.

Specific Control Example of the Vehicle Testing System According to the Present Embodiment]

In a vehicle test performed on a hybrid vehicle, generally, the remaining battery charge is an important parameter in the vehicle test, and there are cases in which it is desirable to start the test once the remaining battery charge has been brought into alignment with predetermined values.

Therefore, in cases such as this, it is possible to set test conditions which ensure that, if the recognition portion 7 is made to recognize the remaining battery charge display light BR acquired by the camera 5, and the remaining battery charge meter, then when the remaining battery charge reaches a predetermined value, a predetermined test is started automatically.

A more specific example of this method is one in which the recognition portion 7 compares images of the remaining battery charge display light BR on the meter panel M sent from the camera 5, with images of the remaining battery charge display light BR in a state in which the value of the remaining battery charge is known, and outputs the comparison results to the test control portion 44.

For example, in a case in which the remaining battery charge is used as a parameter in a vehicle test, the recognition portion 7 recognizes the remaining battery charge display light BR based on position information for the remaining battery charge display light BR on the meter panel M.

Next, based on the state recognition information obtained by associating an image of the remaining battery charge display light BR with the value of the remaining battery charge at the point in time when that image was acquired, the recognition portion 7 determines which image of the values of the remaining battery charge is the same as the image sent from the camera 5, and is able recognize the value of the remaining battery charge at that point in time.

In the case of a remaining battery charge display light BR such as that shown in FIG. 4, the recognition portion 7 can be made to compare which number indicator, out of the four indicators, from the left side is illuminated, with images of the remaining battery charge display light BR in which the value of the remaining battery charge is known, and to thereby recognize the value of the remaining battery charge.

In a case in which all four indicators are illuminated, then this indicates that the remaining battery charge is 100%. If one indicator is not illuminated, then this indicates that the remaining battery charge is 75%. If two indicators are not illuminated, then this indicates that the remaining battery charge is 50%, and if three indicators are not illuminated, then this indicates that the remaining battery charge is 25%.

Because the value of the remaining battery charge is set after having been associated in advance by a user with the start of a predetermined vehicle test, a modification of the test conditions, or the end of a vehicle test, when the results of the recognition by the recognition portion 7 are output to the test control portion 44, the test control portion 44 executes a vehicle test that corresponds to that remaining battery charge value.

For example, the vehicle may be operated in a predetermined driving state (for example, a predetermined test sequence is repeated), and at the point in time when the remaining battery charge drops to 75%, the first vehicle test is started. At the point in time when the remaining battery charge drops to 50%, the first vehicle test is ended, and the testing switches to the second vehicle test. At the point in time when the remaining battery charge drops to 25%, all of the vehicle tests are ended. In this way, a predetermined vehicle test may be started, or the test conditions (i.e., the test sequence) may be modified, or the vehicle test may be ended automatically in accordance with the state of the vehicle.

[Other Control Method of the Vehicle Testing System According to the Present Embodiment]

In a case in which the vehicle is a hybrid vehicle, then even if the main power supply of the vehicle has been turned ON, there are cases in which the engine is not running.

In cases such as this as well, because it is possible to acquire images of the meter panel M of the vehicle, and of meters and display lights and the like located adjacent thereto using the camera 5, it is possible to recognize whether or not the main power supply of the vehicle is turned ON or is turned OFF via the recognition portion 7 based on the state of illumination of the various meters located within the meter panel M.

As a result, in a case in which a vehicle test is conducted using the automatic driving device 2, it is possible to avoid mistakenly recognizing that the vehicle power supply is not turned on based solely on the fact that the vehicle engine is stopped.

Furthermore, in a case in which a vehicle test is conducted using an automatic driving device 2 such as an automatic driving robot, compared with a case in which a person is driving, the problem arises that it is more difficult to notice a vehicle abnormality. If a vehicle test is continued for a prolonged period without a vehicle abnormality being noticed, there is a possibility that this will lead to a breakdown of the vehicle or to an accident or the like.

Therefore, when the recognition portion 7 recognizes a vehicle abnormality, the test control portion 44 controls the automatic driving device 2 and the chassis dynamometer 1 and the like so as to suspend the running of the test body, and so as to stop the vehicle testing of this test body.

If this type of structure is employed, then even if a vehicle test is continued for a prolonged period using the automatic driving device 2, it is possible to prevent an accident without requiring that a user must themself make the effort to recognize the state of the vehicle test.

Examples of abnormalities recognized by the recognition portion 7 include not only abnormal values for the engine revolution speed, overheating in which the engine overheats so that the oil temperature and the cooling water temperature rise to extreme levels, abnormalities in the engine control system sensors, and serious faults such as fuel insufficiencies and the like, but, as is shown in FIG. 5, also abnormalities that can be recognized as a result of the various warning lights being illuminated.

Because the recognition portion 7 recognizes the illumination states of these warning lights, in a case in which a particular predetermined fault occurs, it is also possible to perform a vehicle test for a self-diagnosis function so as to test whether or not the vehicle sensors are operating correctly and the warning lights are turning on as they should.

Furthermore, it is also possible for the recognition portion 7 to recognize states of a vehicle by combining together two or more of the images acquired by the camera 5 and information acquired from an external device, and to control the vehicle testing based on the results subsequently obtained.

For example, it is also possible for cooperative control between the engine and the motor to be recognized from images of two meters, namely, of the tachometer TM and the speedometer SM, acquired by the camera 5, and for the analysis device 3 and also an exhaust gas dilution device that sends samples to this analysis device 3 to be controlled based on the subsequent recognition results.

In addition to this, other combinations are also possible such as the revolution speed of a roller provided in the chassis dynamometer 1 being used in combination with images of the speedometer SM acquired by the camera 5.

By combining images of the meter panel M and the like acquired by the camera 5 with actual exhaust gas analysis results, in cases such as when an abnormality exists in the exhaust gas analysis results, it is possible to predict the cause of such an abnormality from a correlation between the analysis results and the images of the meter panel M.

[Effects of the Vehicle Testing System According to the Present Embodiment]

According to the vehicle testing system 100 having the above-described structure, a user is able to reduce the time and effort required to perform a vehicle test while verifying the states of the test body. Moreover, because it is possible to perform a vehicle test by accurately recognizing states of a vehicle while simultaneously reducing the burden on a user, the accuracy and safety of the vehicle test can be improved.

[Additional Embodiments of the Vehicle Testing System According to the Present Invention]

The present invention is not limited to the above-described embodiment.

For example, the test body is not limited to being a completed vehicle and, for example, may instead be a portion of a vehicle such as an incomplete vehicle or the like that has been prepared in order to test an engine or a drive train or the like. In the case of an incomplete vehicle such as this, instead of the above-described chassis dynamometer, the test may be conducted on a test bench such as an engine bench or the like.

The camera is not limited to being mounted inside a vehicle so as to acquire images of a vehicle interior and, for example, may instead be mounted on an outside of a body or the like of a test body so as to acquire images of an exterior of the test body.

In the case of vehicle in which timings of the battery charging and discharging are displayed on a meter panel or the like, then because the timings of the battery charging and discharging can be additionally used as parameters for the vehicle test, the accuracy of the vehicle testing can be further improved.

The vehicle may be one in which an engine that runs on gasoline is mounted, or may be a hybrid vehicle or a gasoline vehicle.

If the vehicle is a manual transmission vehicle, then based on the numerical value of the tachometer recognized by the recognition portion, it is also possible for the test control portion to issue commands to the automatic driving control portion so as to ensure that clutch operations and other operations performed by the automatic driving robot are performed smoothly.

In the above-described embodiment, a vehicle testing system provided with an automatic driving device such as an automatic driving robot is employed, however, the present invention is not limited to this, and it is also possible to forgo using an automatic driving device and to instead have the vehicle driven by a person.

In the above-described embodiment, a vehicle testing system provided with a camera, a camera control portion, and a recognition portion is employed, however, it is also possible to instead employ a structure in which a state recognition device provided with a camera and a recognition portion is formed as a separate device from the vehicle testing system.

The camera is not limited to acquiring video images, and a camera that acquires static images at predetermined time intervals may be used instead.

The data storage portion may also be in the form of a recording medium that is able to be connected to and disconnected from the control device, and it is also possible, for example, for known image data collected on a recording medium for each vehicle manufacturer and each vehicle model to be used in accordance with the vehicle being tested.

It is not essential that the types of meter and the positions of the display lights and warning lights be recorded in the data storage portion, and it is also possible for a user to specify in advance to the recognition portion which meter types and display lights and warning lights from among the state display portion are to be recognized.

For example, it is also possible for the recognition portion to only determine whether or not an image of the entire state display portion acquired by a camera is the same as an image of the entire state display portion that has been saved as known data, and for the result of this determination to be output to the test control portion, and for the test control portion to control the vehicle testing by recognizing states of the vehicle from the meter types and the illumination states of the display lights and warning lights specified in advance by a user.

It is also possible for a data set showing the various types of meter and the positions of the display lights and warning lights corresponding to the vehicle type to be mutually associated with a data set in which the various types of meter have been associated with an illumination pattern of the display lights and warning lights, and saved on a database, and for this database to be stored in the data storage portion.

When the main power supply for a vehicle has been turned ON, all of the various warning lights and meter types disposed within the meter panel are turned ON, and thereafter, provided that there is no abnormality in their corresponding device, the warnings lights and the like are turned OFF. For this reason, it is also possible for the recognition portion to use images of the meter panel when this is in the fully turned ON state that are sent from the camera, together with the above-described database in order to automatically determine the vehicle type via machine learning, and to then start testing. Moreover, using, for example, a technique such as machine learning, it is also possible for the control device of the present invention to duplicate a vehicle test so as to correspond to a predetermined vehicle state. In this case, the data storage portion stores image data for the meter panel in the predetermined vehicle state, or alternatively stores data obtained by converting values for each meter type from the image data into numerical form. The test control portion then controls the automatic driving control portion and the dynamo control portion and the like such that the image data for the meter panel that was sent from the camera and recognized by the recognition portion matches the image data for the meter panel in the predetermined vehicle state stored in the data storage portion, or matches the data obtained by converting values for each meter type from the image data into numerical form. Next, once the respective sets of data match each other, the test control portion performs the vehicle test. As a result, a vehicle test can be duplicated so as to match a predetermined vehicle state.

The recognition performed by the recognition portion is not limited to being only a determination as to whether or not known images associated with a particular predetermined state of a vehicle are the same as images sent from a camera, and it is also possible for the recognition portion and the test control portion and the like to determine a vehicle state from the state of changes in the vehicle information and the like.

For example, it is also possible for the configuration of each type of meter and warning light and the like to be stored as known image data in the storage portion, and for the recognition portion to recognize the position of a target meter or warning light or the like from the images of the meter panel and the like that were acquired when these were in the fully turned ON state, and from the aforementioned image data showing the configuration of each type of meter and warning light and the like.

Furthermore, it is also possible for the recognition portion to detect changes and the like in the illumination state of the target meter or warning light or the like via image recognition for the target meter or warning light or the like whose position has been determined in the manner described above, and for the recognition portion or the test control portion to recognize the state of a test body based on any detected changes.

In this case, it is not absolutely essential that known images that have been associated with specific states of a vehicle, or a database such as that described above be stored in advance in the data storage portion.

Note that, in the above-described embodiment, a test body was tested on a test bench, however, the present invention can be applied even in a case in which the test body is traveling on a road. In this case, the above-described automatic driving device 2 drives the vehicle when this is traveling on the road, and the above-described analysis device 3 is a vehicle on-board type of analyzer that analyzes exhaust gas and the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

INDUSTRIAL APPLICABILITY

According to the present invention, it is possible to provide a vehicle testing system that makes it possible for the burden on a user when testing a vehicle to be reduced, while maintaining the accuracy of the vehicle test.

What is claimed is:

1. A vehicle testing system that tests a test body in a form of a vehicle or a part of a vehicle on a test bench, comprising:
a camera that acquires images of a state display portion of the test body that displays states of the test body to a driver of the test body; and
a control device that controls testing of the test body based on images acquired by the camera, wherein
the control device comprises:
a recognition portion that recognizes a state of the test body based on the images; and
a test control portion that controls a predetermined test when the state of the test body as recognized by the recognition portion attains a predetermined state.

2. The vehicle testing system according to claim 1, further comprising an automatic driving device that drives the test body automatically on the test bench, wherein
the test control portion controls the automatic driving device in accordance with recognition results from the recognition portion.

3. The vehicle testing system according to claim 1, further comprising an analysis device that analyzes exhaust gas emitted from the test body, wherein
the test control portion controls the analysis device in accordance with recognition results from the recognition portion.

4. The vehicle testing system according to claim 1, wherein the recognition portion detects changes in the images acquired by the camera, and determines the state of the test body based on the detected changes in the images.

5. The vehicle testing system according to claim 1, wherein
the control device further comprises a data storage portion in which image data associated with the states of the test body is stored in advance, and
the camera acquires images of the state display portion at timings when the state display portion is fully illuminated, and
the recognition portion recognizes positions of the image data in the state display portion by searching for the image data stored in the data storage portion from the images of the state display portion when fully illuminated acquired by the camera.

6. The vehicle testing system according to claim 5, wherein the recognition portion recognizes states of the test body based on changes in a portion of the images, out of the images acquired by the camera, for which positions of the image data have been established.

7. The vehicle testing system according to claim 1, wherein
the recognition portion recognizes a remaining battery charge of the test body as the state of the test body, and, in a case in which the remaining battery charge has reached a predetermined value, the test control portion controls predetermined tests.

8. The vehicle testing system according to claim 1, wherein
the recognition portion recognizes an ON/OFF state of a main power supply of the test body as the state of the test body, and,
in a case in which the main power supply of the test body is turned ON, the test control portion controls vehicle testing of the test body.

9. A vehicle testing method in which a test body in a form of a vehicle or a part of a vehicle is tested on a test bench, in which images of a portion of the test body are acquired and vehicle testing is controlled based on the acquired images, the vehicle testing method comprising:
recognizing a state of the test body based on the images, wherein the images are of a state display portion of the test body that displays states of the test body to a driver of the test body; and
controlling a portion of a predetermined test when the state of the test body as recognized by a recognition portion attains a predetermined state.

10. A vehicle testing system that tests a test body in a form of a vehicle or a part of a vehicle, comprising:
a test bench for simulated driving of the test body;
a camera that acquires images of a portion of the test body on the test bench; and
a control device that controls testing of the test body based on images acquired by the camera, wherein
the control device comprises:
a recognition portion that recognizes a state of the test body based on the images; and
a test control portion that controls a predetermined test when the state of the test body as recognized by the recognition portion attains a predetermined state.

* * * * *